United States Patent [19]

Burt

[11] Patent Number: 4,797,942
[45] Date of Patent: Jan. 10, 1989

[54] PYRAMID PROCESSOR FOR BUILDING LARGE-AREA, HIGH-RESOLUTION IMAGE BY PARTS

[75] Inventor: Peter J. Burt, Princeton, N.J.

[73] Assignee: General Electric, Princeton, N.J.

[21] Appl. No.: 20,818

[22] Filed: Mar. 2, 1987

[51] Int. Cl.$^4$ ............................................. G06K 9/36
[52] U.S. Cl. ........................................ 382/41; 382/1; 382/43; 358/87
[58] Field of Search ................... 250/208; 356/114; 358/133, 160, 166, 167, 109, 204, 293, 294, 87, 903; 382/1, 17, 41, 43, 49, 54, 57, 62

[56] References Cited

U.S. PATENT DOCUMENTS

| | | | |
|---|---|---|---|
| 4,148,062 | 4/1979 | Kamin | 382/62 |
| 4,393,410 | 7/1983 | Ridge et al. | 358/294 |
| 4,447,886 | 5/1984 | Meeker | 364/725 |
| 4,523,230 | 6/1985 | Carlson et al. | 358/167 |
| 4,550,437 | 10/1985 | Kobayashi et al. | 382/41 |
| 4,571,593 | 5/1985 | Keller et al. | 358/87 |
| 4,661,986 | 4/1987 | Adelson | 382/17 |
| 4,674,125 | 6/1987 | Carlson et al. | 382/41 |
| 4,683,496 | 7/1987 | Tom | 382/49 |

OTHER PUBLICATIONS

"The Laplacian Pyramid as a Compact Image Code", by Peter J. Burt et al., *IEEE Trans. on Communications*, vol. COM-31, No. 4, Apr. 1983, pp. 532–540.

Primary Examiner—Leo H. Boudreau
Assistant Examiner—Jose L. Couso
Attorney, Agent, or Firm—Joseph S. Tripoli; Eric P. Herrmann

[57] ABSTRACT

A technique, employing image-processing pyramids, which is capable of combining a plurality of small-area high-resolution sub-images, such as may be derived from an array of television cameras, into a single large-area high-resolution image, with substantially no introduction by such processing of image-artifacts in the combined single image.

19 Claims, 6 Drawing Sheets

SMALL ADJACENT CAMERA POSITIONAL ERROR

Fig. 3a

PARTIONED-AREA APPROACH

Fig. 4

OVERLAPPED-AREA APPROACH

OVERLAPPED-AREA APPROACH $G_2$ DERIVATION

*Fig. 6*

PARTITIONED-AREA APPROACH $G_2$ DERIVATION

*Fig. 6a*

$L_0$ AND $L_1$ DERIVATION

PYRAMID PROCESSOR FOR BUILDING LARGE-AREA, HIGH-RESOLUTION IMAGE BY PARTS

BACKGROUND OF THE INVENTION

I. Field of the Invention

This invention relates to an image processing technique for seaming together a plurality of separate small-area high-resolution sub-images to provide a spatial frequency spectrum of a single large-area high-resolution image substantially without introducing image artifacts (e.g., defects at the sub-image seams of the single image). More particularly, the present invention is directed to such a technique making use of pyramid spatial-frequency spectrum analyzers.

II. Description of the Prior Art

Pyramid spectrum analyzers and synthesizers suitable for use in image processing are known in the art, and are described, by way of examples, in U.S. Pat. No. 4,447,886, issued May 8, 1984 to Meeker; U.S. Pat. No. 4,523,230, issued June 11, 1985 to Carlson, et al; and co-pending allowed U.S. Pat. No. 4,692,806, filed Apr. 4, 1984 by Carlson, et al, and assigned to the same assignee as the present application. This co-pending Carlson, et al. patent application, entitled "Real-Time Hierarchal Pyramid Signal Processing Apparatus," discloses pipeline architecture for performing the Burt Pyramid analyzer and/or synthesizer algorithm on a video signal defining successive television image frames. The Burt Pyramid is described in the article "The Laplacian Pyramid as a Compact Image Code," by Peter J. Burt, et al., *IEEE Transactions on Communications,* Vol. COM-31, No. 4, 532–540, April 1983.

One use of pyramid processing is in so-called machine vision, which is employed for such purposes as surveillance cameras, robotics, and automated "visual inspection" of manufactured items for defects. In this regard, reference is made to co-pending U.S. Pat. No. 4,692,806, filed Apr. 8, 1986 by Anderson, et al., and assigned to the same assignee as the present application. A programmed implementation of the image-data reduction technique disclosed in the co-pending Anderson, et al. application may be carried out by pyramid processor apparatus disclosed in co-pending U.S. Pat. No. 4,703,514, filed Sept. 16, 1985 by van der Wal and assigned to the same assignee as the present application.

In the past, the images processed by pyramid processors were usually derived from a single television camera. Any television camera is capable of viewing only a given limited field of view with a predetermined maximum resolution. If it is desired to view a larger field with this predetermined maximum resolution, it becomes necessary to employ an array comprised of a plurality of television cameras having overlapping fields of view and then "seam" together separate images, derived respectively from each of these television cameras of the array. Such seams, if noticeable, are image artifacts that degrade a large-area, high-resolution image comprised of a plurality of seamed small-area sub-images derived respectively from the separate television cameras of the array. In the case of machine vision, seam artifacts are a particular problem, since they are capable of producing analysis errors that cannot be tolerated. The pyramid processing technique of the present invention overcomes this problem.

SUMMARY OF THE INVENTION

The present invention is directed to a pyramid-processing technique for deriving, substantially without the introduction of spurious spatial-frequency image artifacts the spatial-frequency spectrum analysis of a single large-area, high-resolution image having a given pixel density from an array of small-area, high-resolution sub-images each of which also has said given pixel density. The pyramid processing technique of the present invention derives a separate set of Laplacian-output pyramid levels $L'_0 \ldots L'_{K-1}$ lower than a certain pyramid level K (where K is a given positive integer) for each individual one of the sub-images. The Laplacian-output pyramid level $L'_0$ has the given pixel density and each Laplacian output pyramid level above $L'_0$ has a pixel density smaller than its immediately preceding Laplacian-output pyramid level. In addition to deriving a separate set of Laplacian-output pyramid levels $L'_0 \ldots L'_{K-1}$, the pyramid-processing technique of the present invention also derives a single Gaussian-output pyramid level $G_K$ for the entire large area. The Gaussian-output pyramid level $G_K$ has a pixel density which is smaller than the pixel density of the Laplacian-output pyramid level $L'_{K-1}$. The respective pixels of each individual set of Laplacian-output pyramid levels $L'_0 \ldots L'_{K-1}$ and the respective pixels of the single Gaussian-output pyramid level $G_K$ are separately stored.

In addition, when desirable, stored pixels may be employed for either or both of two different purposes. The first purpose comprises deriving a Laplacian-output for the K pyramid level or higher, and/or a Gaussian-output for the (K+1) pyramid level or higher, from Gaussian-output pyramid level $G_K$. This is accomplished either by repeating the pyramid processing technique of the present invention one or more times and/or by employing conventional pyramid analyzing techniques. The second purpose comprises deriving one or more Gaussian-output pyramid levels $G_{K-1} \ldots G_0$ from the stored pixels by employing conventional pyramid synthesizing techniques.

A desirable feature of the pyramid processing technique of the present invention is that it permits parallel processing to be employed in its implementation.

DESCRIPTION OF THE PREFERRED EMBODIMENTS

Figure 1:
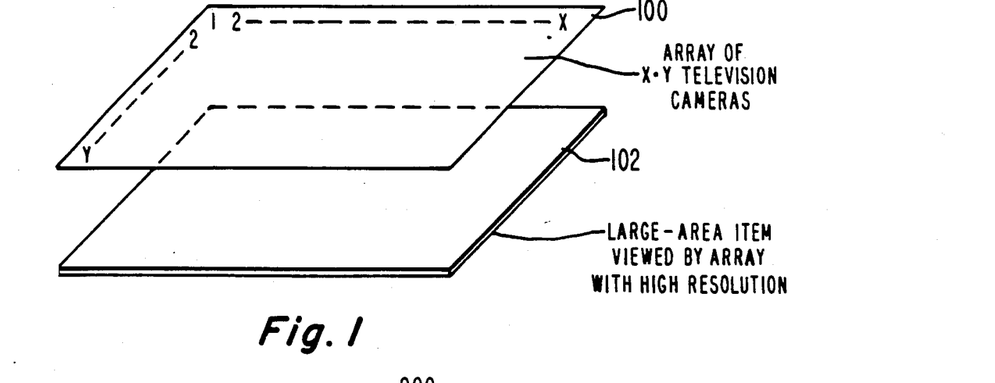
FIG. 1 diagrammatically illustrates a two-dimensional array of television cameras viewing a large-area item with high resolution.

In the manufacture of such large-area items as printed-circuit boards, face plates and shadow masks for color-television cathode ray tubes, etc., it is necessary to visually inspect such items with high resolution for defects. Also, it is also desirable to analyze large-area images obtained from satellite or high-flying aircraft with high resolution. From the points of view of both speed and cost-saving, it would be desirable to utilize machine vision (such as that disclosed in the aforesaid Anderson et al. application) to automate such visual inspection. However, the limited field-of-view of a single television camera is insufficient to image simultaneously with high resolution (i.e. high pixel density) the entire area of such a large-area item. Therefore, as shown in FIG. 1 for illustrative purposes, it takes an array 100 of K·Y television cameras (where at least one of X and Y is a plural integer) to view simultaneously large-area item 102 with high resolution.

Figure 2:
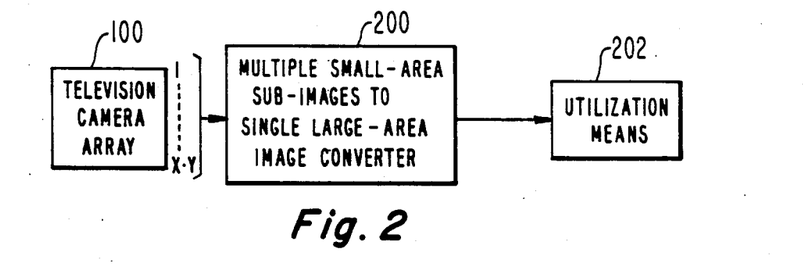
FIG. 2 is a block diagram of a converter for converting multiple small-area sub-images from a television camera array to a single large-area image for use by utilization means.

The respective television cameras of array 100 utilized in machine vision may be digital cameras or alternatively, may be analog cameras each of which has its output converted to digital form by an analog-to-digital (A/D) converter associated therewith. In any case, as shown in FIG. 2, television camera array 100 derives X·Y separate digital video outputs that are applied as respective inputs to multiple small-area sub-images to single large-area image converter 200. The converted single large-area image information is applied to utilization means 202, which may include means for comparing the large-area image information derived from converter 200 (which corresponds with the actual item then being viewed by the television camera array with high resolution) with stored image information pertaining to a corresponding item known to have no defects. Based on this comparison, utilization means 202 is programmed to make the decision as to whether or not the particular item then being viewed by the array of television cameras passes inspection.

Figure 3:
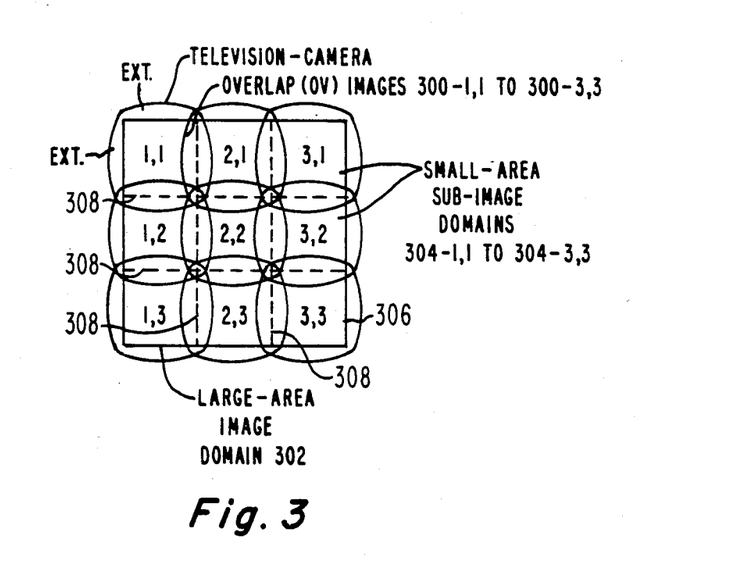
FIG. 3 is an illustrative example of how contiguous small-area sub-image domains, which correspond respectively to television-camera overlap images of the array, comprise a single large-area image domain.

For illustrative purposes, it is assumed in FIG. 3 that the respective values of each of X and Y is 3 (although, in practice, each of these values may be either smaller or larger than 3). As indicated in FIG. 3, a 3·3 array of television cameras provides 9 separate overlapped (OV) television-camera images 300-1,1 to 300-3,3. The field-of-view of the whole array of 9 television cameras includes rectangular (e.g. square) shaped, large-area image domain 302 (delineated by perimeter 306). The respective portions of large-area image domain 302 that are within the field-of-view of each individual one of the 9 television cameras are comprised of abutting, rectangular (e.g., square) shaped, small-area sub-image domains 304-1,1 to 304-3,3 (delineated by perimeter 306 and dashed seam lines 308).

Figure 3A:
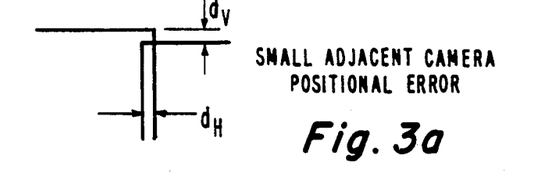
FIG. 3a diagramatically illustrates the effect of small positional errors in the placement of adjacent cameras of the array.

As indicated in FIG. 3, each of the television-camera images 300-1,1 to 300-3,3 extends into those sub-image domains 304-1,1 to 304-3,3 that are adjacent to the particular sub-image domain with which that television camera image is individually associated. Further, those television-camera images associated with edge or corner sub-image domains, include portions exterior (EXT) to the perimeter 306 of large-area image domain 302. The problem is to combine the separate image information from each of the 9 overlapped images 300-1,1 to 300-3,3 in such a manner as to derive a single image comprised of all the image information within perimeter 306 of large-area image domain 302, and to accomplish this with negligible introduction of error. One type of error to be avoided (or at least minimized) is the introduction of artifacts at seam lines 308 of the small-area sub-image domains. Another type of error results from the fact that it is not possible to perfectly align the television cameras of the array. Therefore, as shown in FIG. 3a, there will always be small positional errors between adjacent cameras of the array, causing horizontal misalignment $d_H$ and vertical misalignment $d_V$ between adjacent small-area sub-image domains. Additional error results from the fact that it is not possible to achieve identical gains for all of the respective television cameras in the array. The present invention obviates these errors.

Figure 3B:
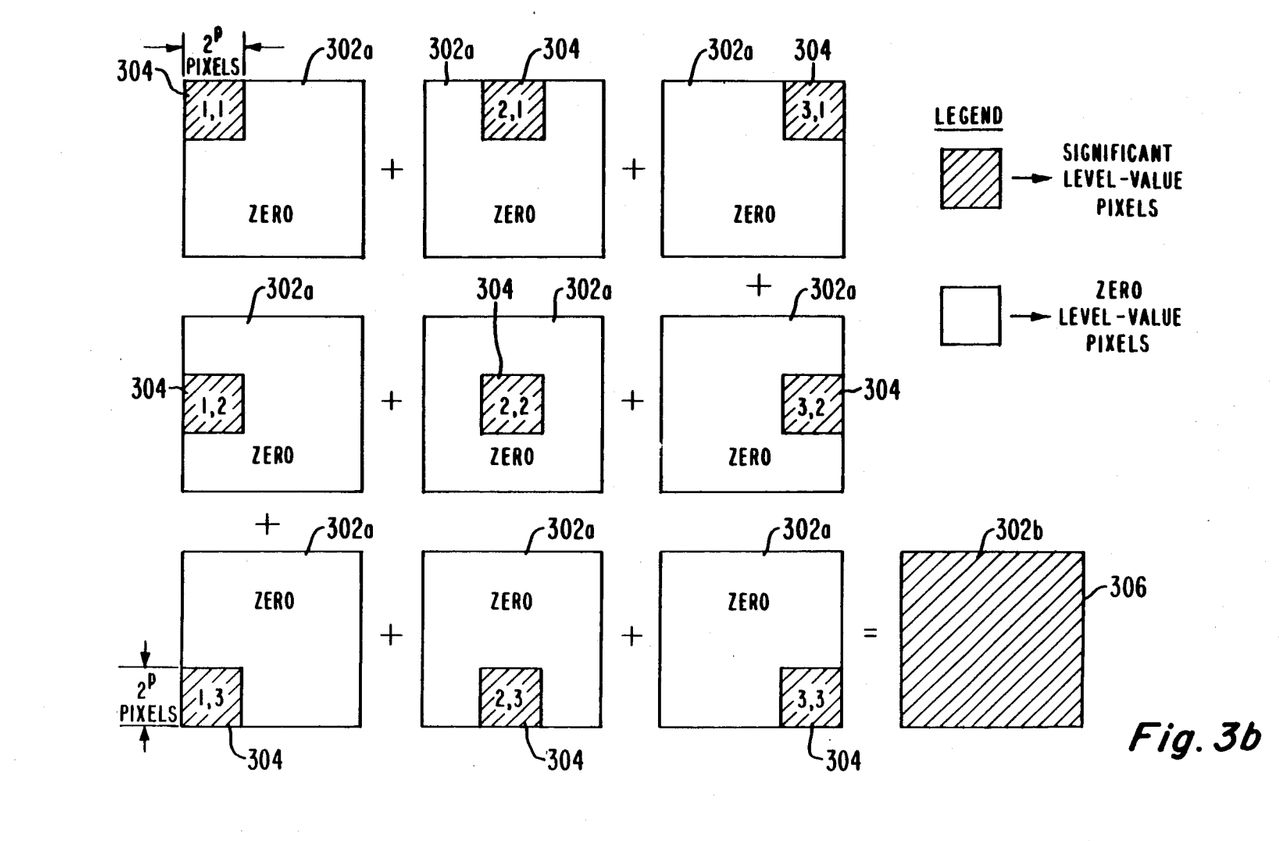
FIG. 3b diagrammatically illustrates the basic premise taken by the present invention in combining the small-area sub-image domains of FIG. 3 to derive therefrom a single large-area image domain.

FIG. 3b illustrates the basic premise employed by the present invention in solving this problem of error in the deviation of large-area image domain 302 by combining a plurality of abutting small-area sub-image domains 304-1,1 to 304-3,3, each of which is associated respectively with separate ones of television-camera images 300-1,1 to 300-3,3. As indicated in FIG. 3b, each of the abutting small-area sub-image domains 304-1,1 to 304-3,3 can be thought of as being comprised of all the pixels within a large-area component domain 302a, wherein only those pixels within that particular sub-image domain have significant level values and all the remaining pixels within such large-area component domain 302a have zero level values. As shown pictorially in FIG. 3b, combining all 9 of the separate large-area component domains 302a results in large-area resultant domain 302b comprised solely of significant level value pixels. This premise permits each of the 9 component large-area component domains 302a, to be separately processed, prior to being combined into large-area resultant domain 302b. Such separate processing of respective large-area component domains 302a may be done in parallel.

Figure 4:
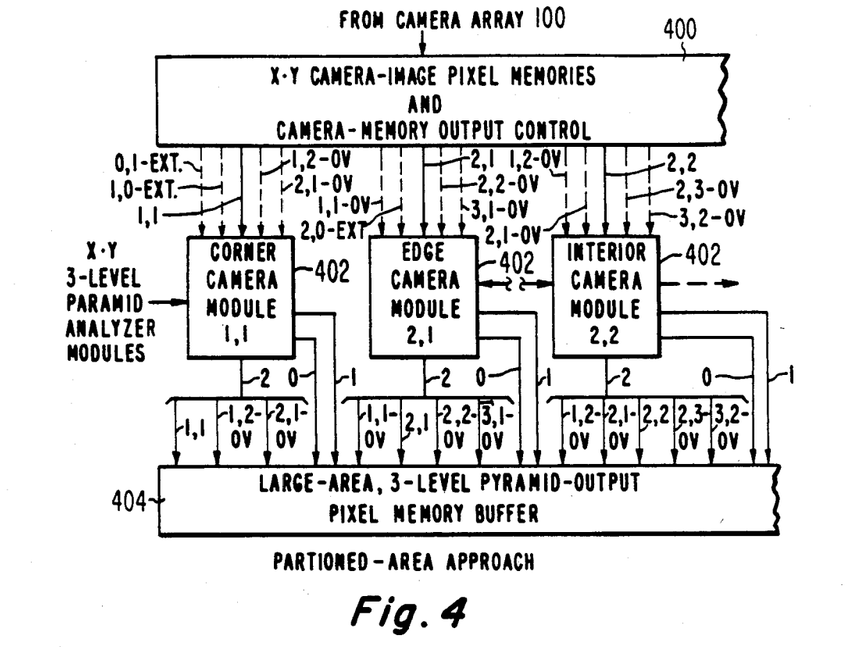
FIG. 4 is a block diagram of a first preferred embodiment of the present invention for performing a so-called partitioned-area approach to combining small-area sub-images.

Referring to FIG. 4, there is shown a first embodiment of the present invention, which employs parallel pyramid processors (although a single pyramid processor operated sequentially could be used instead). As shown in FIG. 4, X·Y camera-image pixel memories and output control 400 stores the pixels of each of television-camera images 300-1,1 to 300-3,3. In addition, the camera-memory output control portion of block 400 controls the readout of stored pixels from the pixel memories portion of block 400. The read-out stored pixels are applied as inputs to appropriate ones of X·Y 3-level pyramid analyzer camera modules 402-1,1 ... 402-X,Y. In the assumed case, in which both X and Y are equal to three, there will be a total of 9 camera modules, each of which is associated with a corresponding one of the overlap images 300-1,1 to 300-3,3. These camera modules are comprised of 4 corner modules (e.g., corner camera module 402-1,1) and 4 edge camera modules (e.g., edge, module 402-2,1) which are associated with one or more sides of the perimeter 306 of large-area image domain 302. In addition, the 9 pyramid analyzer modules include the interior camera module 402-2,2, which is surrounded by other sub-image domains and, therefore, is not associated with perimeter 306 of large-area image domain 302.

The camera-memory output control portion of block 400 applies the level values of all the stored pixels associated with each sub-image as an input to its corresponding camera module (as indicated in FIG. 4 by a solid line). Also, the actual (or substituted) level values of selected pixels within the overlap (OV) portion of those sub-images which are adjacent to each particular sub-image are applied as inputs to the camera module corresponding to that particular sub-image (as indicated in FIG. 4 by dashed lines). Further, in the case of corner or edge camera modules, actual (or substitute) level values of selected pixels exterior to each particular corner or edge sub-image are applied as inputs to the camera module corresponding to that particular corner or edge sub-image (as is also shown in FIG. 4 by dashed lines).

Figure 5:
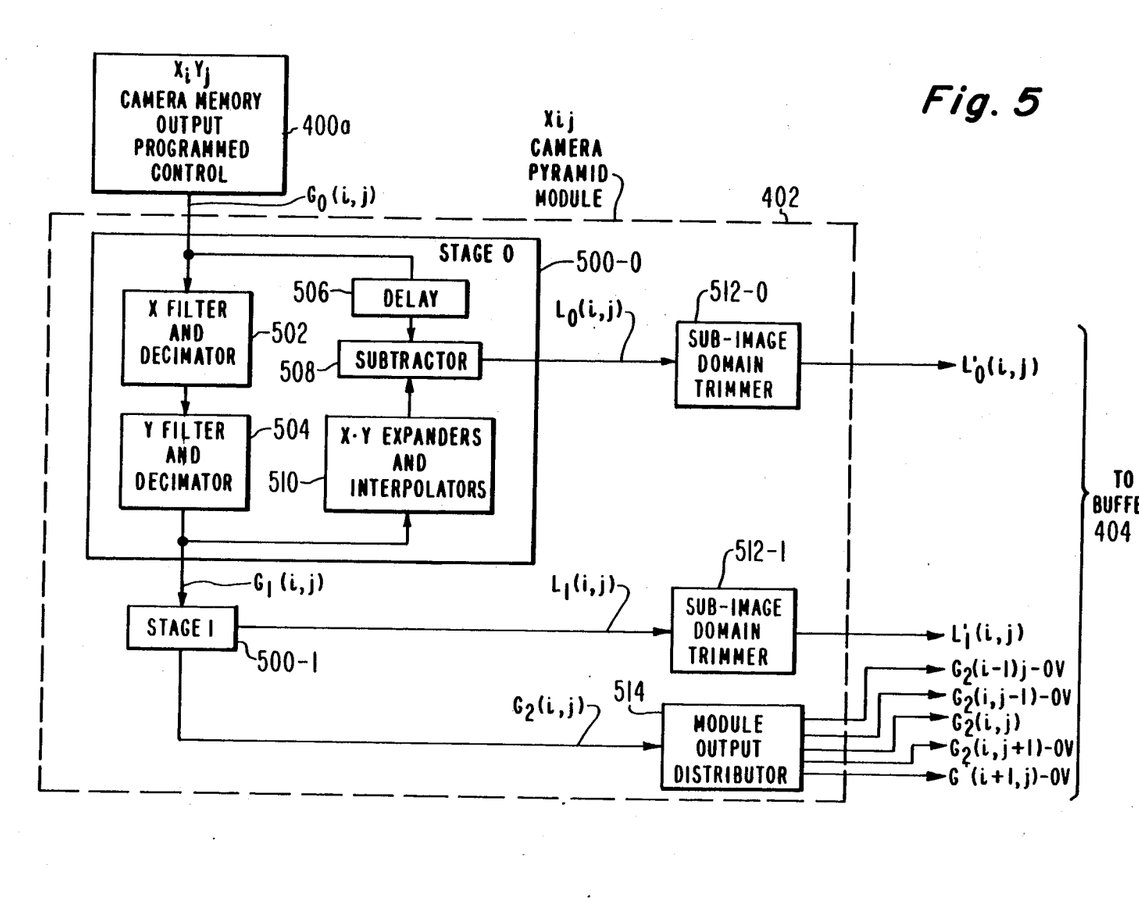
FIG. 5 illustrates a preferred embodiment of a typical camera module that may be employed in FIG. 4 or 4a, together with a block diagram of a camera memory output programmed control therefor.

A preferred embodiment of pyramid analyzer camera module 402 (employing separable two-dimensional spatial filters) is shown in FIG. 5, discussed below. At this point, all that need be said is that each module derives a zero (0) pyramid level Laplacian output $L'_0$, a first (1) pyramid level Laplacian output $L'_1$, and a second (2) pyramid level Gaussian output $G_2$, as shown in FIG. 4. The pixels of the Laplacian outputs $L'_0$, and $L'_1$ from each of the respective modules 402 are stored in large-area, three-level pyramid-output pixel memory buffer 404.

In a first embodiment of the present invention, shown in FIG. 4, the derivation of $G_2$ employs a so-called partitioned-area approach, which is described in detail below. At this point, all that is important is the fact that the $G_2$ output from each module 402 includes selected pixel level values pertaining to sub-image areas adjacent to each particular sub-image area, in addition to all of the pixel level values of that particular sub-image. Thus, in the case of interior camera module 402-2,2, for instance, the $G_2$ Gaussian includes selected pixels of sub-images 1, 2-OV and 3,2-OV, situated respectively to the left and right of sub-image 2,2; selected pixels of sub-images 2,1-OV and 2,3-O, situated respectively on the top and bottom of sub-image 2,2; and all of the pixels of sub-image 2,2, itself. In buffer 404, the level values of corresponding pixels of the Gaussian $G_2$ outputs for each sub-image derived from different modules 402 are summed, and the resultant sum level-value of that pixel is stored.

Figure 4A:
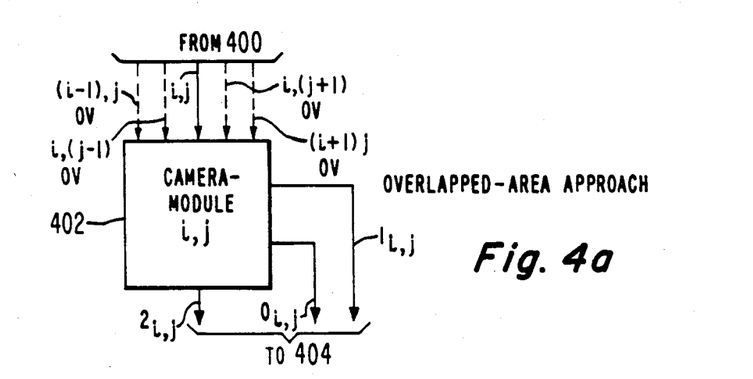
FIG. 4a diagramatically illustrates a modification of FIG. 4 that provides a second preferred embodiment of the present invention for performing a so-called overlapped-area approach to combining small-area sub-images.

The second embodiment of the present invention, employing a so-called overlapped-area approach (rather than a partitioned-area approach) is shown in FIG. 4a. The camera-modules 402 employed in the overlapped-area approach, which do not differ in structure from the camera-modules employed in the partitioned-area approach of FIG. 4, preferably are embodied in the manner shown in FIG. 5, described below. However, as discussed in more detail below, the operation of the camera-modules 402 in the overlapped-area approach is significantly different from the operation of camera modules 402 in the partitioned-area approach. At this point, all that need be said is that in the overlapped-area approach, the Gaussian output $G_2$ from each module is comprised solely of all the pixels of the particular sub-image that corresponds with that camera module. The level values of each of the Gaussian output $G_2$ pixels derived from each module 402 in the overlapped area approach differs significantly from the level values of the corresponding pixels of the Gaussian output $G_2$ derived from each module 402 in the partitioned-area approach. However, the Laplacian outputs $L'_0$ and $L'_1$ pixel level values from each module 402 in the partitioned-area approach of FIG. 4 and the overlapped-area approach of FIG. 4a are the same as one another.

Referring to FIG. 5, for illustrative purposes, each of camera pyramid modules 402 is assumed to comprise a two-stage Burt Pyramid analyzer of a type disclosed in the aforesaid U.S. Pat. No. 4,674,125, and in the aforesaid U.S. Pat. No. 4,523,230 (but, instead, may comprise a two-stage filter-subtract-decimate (FSD) pyramid analyzer of the type also disclosed in the aforesaid U.S. Pat. No. 4,674,125. The two-stage Burt Pyramid analyzer is comprised of stages 500-0 and 500-1. Each of the stages includes X filter and decimator 502, Y filter and decimator 504, delay means 506, subtractor 508 and X and Y expanders and interpolators 510.

The zero stage 500-0 derives a Gaussian output signal $G_1$ from Y filter and decimator 504 and a Laplacian output signal $L_0$ from subtractor 508. The Gaussian $G_1$ signal is applied as an input to stage 500-1, which is similar in structure to stage 500-0. The Laplacian output signal $L_0$ is applied as an input to sub-image domain trimmer 512-0, which operates in a manner discussed in more detail below to forward to its $L'_0$ output only those Laplacian $L_0$ pixels which are situated entirely within the sub-image domain corresponding to that particular camera pyramid module 402. In a similar manner, sub-image domain trimmer 512-1, associated with stage 500-1, operates to derive trimmed Laplacian output signal $L'_1$ from Laplacian output $L_1$ from stage 500-1. The Gaussian $G_2$ output signal from stage 500-1, (which is derived from its Y filter and decimator) is applied as an input to module output distributor 514. Distributor 514 operates to selectively steer pixels of its $G_2$ signal input to its five respective $G_2$ outputs in a manner described in more detail below. Respective pixels of the $L'_1$ Laplacian output signal from sub-image domain trimmer 512-1, and the respective pixels of the five $G_2$ Gaussian output signals from module output distributor 514 are forwarded to buffer 404 and stored therein in a manner described below.

Figure 6:
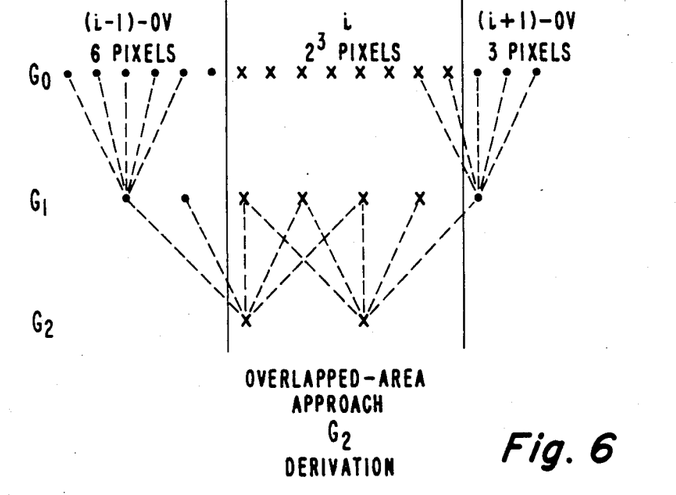
FIGS. 6 and 6a respectively illustrate examples of the overlapped-area approach and the partitioned-area approach of the present invention.
Figure 6A:
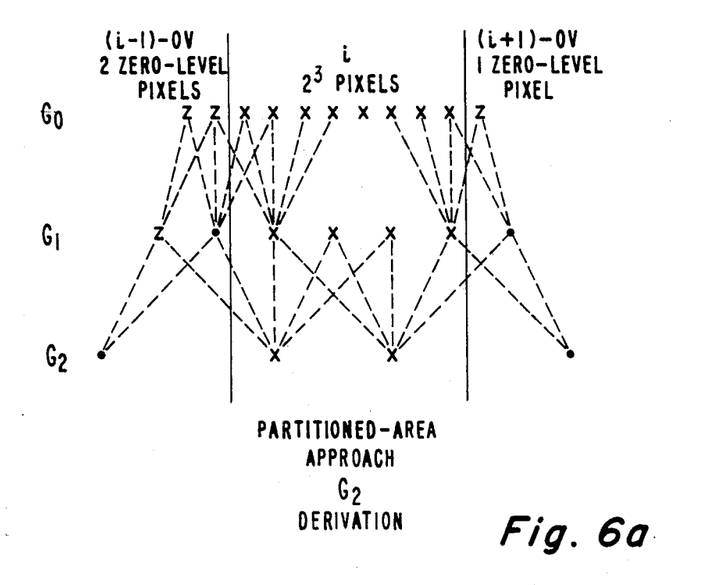

FIGS. 6 and 6a, respectively, illustrate the principles of the overlapped-area approach and the partitioned-area approach respectively employed in the FIGS. 4a and 4 embodiments (which employs 3-level pyramid analyzer modules). For simplicity sake, in FIG. 6 and 6a only one dimension of pixels (horizontal) is considered. However, the principles exemplified in FIGS. 6 and 6a apply as well to the two-dimensional (both horizontal and vertical) case shown in FIGS. 4a and 4. For illustrative purposes, it is assumed in FIGS. 6 and 6a that each stage of the pyramid employs a five-tap filter; that the number of pixels in each horizontal row of each small-area sub-image domain 304-1,1 to 304-3,3 is $2^3$, (for the 3-level pyramid analyzer case), so that the total number of pixels in each horizontal row is only 8. In practice, the total number of pixels in each row would be $C2^3$, where C is an integer which is normally greater than unity. In general, the number of pixels in each row would be $C2^K$ for K-level pyramid analyzer modules.

As indicated in FIG. 6, the overlapped area approach derives $G_2$ pixels situated wholly within the i sub-image domain by operating on pixels $G_0$ and $G_1$ situated within both the image domains to the left and to the right of the i sub-image domain, as well as on the pixels of the i sub-image domain itself. More specifically, in the assumed case, the one-dimensional filter and decimator of the (0) pyramid stage, employing a five-coefficient kernel weighting function, operates on the last six contiguous $G_0$ pixels in the $(i-1)$-OV sub-image domain, all of the $2^3$ (8) $G_0$ pixels of the i sub-image domain, and the first three contiguous $G_0$ pixels of the $(i+1)$-OV sub-image domain. This operation results in the deviation of two contiguous $G_1$ pixels of the $(i-1)$-OV image domain, $2^2$ (4) $G_1$ pixels of the i sub-image domain, and one $G_1$ pixel of the $(i+1)$-OV sub-image domain. A similar operation on these $G_1$ pixels by a one-dimensional filter and decimator of the (1) pyramid stage, employing a five-coefficient kernel weighting function, results in the derivation of $2^1$ (2) $G_2$ pixels situated wholly within the i sub-image domain. Thus, the overlapped-area approach to $G_2$ derivation is a convergent operation employing all the pixels of its own sub-image domain (designated in FIG. 6 by x's), as well as additional pixels from the sub-image domains to the left and to the right thereof (designated in FIG. 6 by dots).

As shown in FIG. 6a, the derivation of $G_2$ pixels from the $G_0$ pixels by the partitioned-area approach is divergent (rather than convergent as in the overlapped-area approach of FIG. 6). Specifically, only the $G_0$ pixels of the i sub-image domain itself contribute significant level value pixels to the derivation of the $G_1$ and $G_2$ pixels. However, two zero-level $G_0$ pixels and one zero-level $G_1$ pixel (designated in FIG. 6a by z's) are employed by the $(i-1)$-OV sub-image domain and one zero-level $G_0$ pixel is employed by the $(i+1)$-OV sub-image domain. As indicated by the dashed lines in FIG. 6a, these zero-level pixels contribute to the operation of the five-coefficient kernel weighting function filter of the first pyramid stage, when it is operating on those pixels on the i sub-image-domain in the vicinity of its left and right boundaries. The result is that $G_2$ pixels having significant level values are derived which are situated in the $(i-1)$-OV and $(i+1)$-OV sub-image domains (designated in FIG. 6a by dots), as well as in the i sub-image domain itself (designated in FIG. 6a by x's).

Employing the teachings of FIG. 6a and the specific structure shown in FIG. 5, the partitioned-area approach for deriving the $G_2$ pixels will now be described. Under its programmed camera-memory output control, stored pixels from pixel memories 400 of each of camera modules 402 are read out and applied as the $G_0$ input signal to each of the respective camera modules 402. Specifically, the $G_0$ input signal for each individual one of camera modules 402 is comprised of a serial stream of pixels in which pixels that correspond to the exterior (EXT) and/or overlap (OV) inputs to a camera module have zero level values and the remaining pixels thereof have significant level values. Such zero level value pixels are derived by the camera memory output program control inserting, where appropriate, substituted zero level value pixels for corresponding significant level value pixels stored in memories 400 during readout. Further, the respective $G_0$ input signals to the respective camera modules 402 are read out in parallel from pixel memories 400.

When the one-dimensional partitioned-area approach taught in FIG. 6a is expanded to two (horizontal and vertical) dimensions, $G_2$ pixels will be derived for sub-image domains situated on top and on bottom and corners of each particular sub-image domain in addition to sub-image domains situated to the left and right of each particular sub-image domain.

Module output distributor 514 steers the $G_2$ pixels derived from stage 500-1 of the pyramid to the appropriate one of its five separate sub-image domain outputs. In the case of an interior camera module (such as interior camera module 402-2,2), all five of these $G_2$ sub-image domain outputs from that interior camera module output distributor are applied as inputs to buffer 404. However, in the case of corner camera modules (such as corner camera module 402-1,1) and edge camera modules (such as edge camera module 402-2,1), only those $G_2$ outputs of distributor 514 associated with sub-image domains within perimeter 306 of the large-area domain 302 are applied as inputs to buffer 404. Buffer 404 includes summation means for adding all corresponding pixel level values of the same sub-image domain, although such corresponding pixels are derived from separate ones of camera modules 402. Thus the level values of each pixel of sub-image domain 1,1-OV derived from camera module 2,1 is added to the level value of the corresponding pixel of sub-image domain 1,1 derived from camera module 402-1,1. The summing provides the merging of the $G_2$ corresponding pixel level values of all the separate small-area sub-image domains 304-1,1 to 304-3,3 into the $G_2$ pixels of single large-area image domain 302 that are stored in pixel memory buffer 404.

Employing the teaching of the overlapped-area approach of FIG. 6, it is apparent that each one of the camera modules 402 derives a single $G_2$ pixel output, shown in FIG. 4a, corresponding solely to its own sub-image domain. Therefore, the respective level value of each $G_2$ pixel of each of the respective camera modules is stored (without any need for summing corresponding pixel level values derived from different camera modules) in buffer 404. However, in the case of the overlapped-area approach, the camera memory output programmed control applies significant level-value exterior (EXT) and/or overlap (OV) pixels $G_0$ stored pixels from memories 400 as inputs to each of camera modules 402, in addition to significant level value $G_0$ pixels corresponding to each of the respective camera modules of memories 400. The result in the overlapped-area approach, as in the partitioned-area approach, is to store in buffer 404 the $G_2$ pixel level values of large-area image domain 302 which corresponds to the merger of all the small-area sub-image domains 304-1,1 to 304-3,3.

The $L'_0$ and the $L'_1$ Laplacian pixel values derived by each of camera modules 402 are not merged. On the contrary, in most cases, only a restricted group of derived Laplacian pixels from each camera module that fall wholly within the particular abutting sub-image domain corresponding to that camera module are stored in buffer 404. Specifically, the $L_0$ and $L_1$ pixels derived from stage 0 and stage 1 of the pyramid of each camera module from the $G_0$ input (see FIG. 5) correspond in position to the $G_0$ and $G_1$ pixels of the overlapped-area approach shown in FIG. 6. Thus, the $L_0$ and $L_1$ *pixels respectively include those* $G_0$ and $G_1$ pixels shown in FIG. 6 that are designated both by dots and by x's. However, in the FIG. 5 embodiment, sub-image domain trimmers 512-0 and 512-1 permit only the respective $L_0$ and $L_1$ pixels corresponding solely to the $G_0$ and $G_1$ pixels designated with x's in FIG. 6 to be forwarded as $L'_0$ and $L'_1$ outputs from each camera module that are stored in buffer 404.

Figure 7:
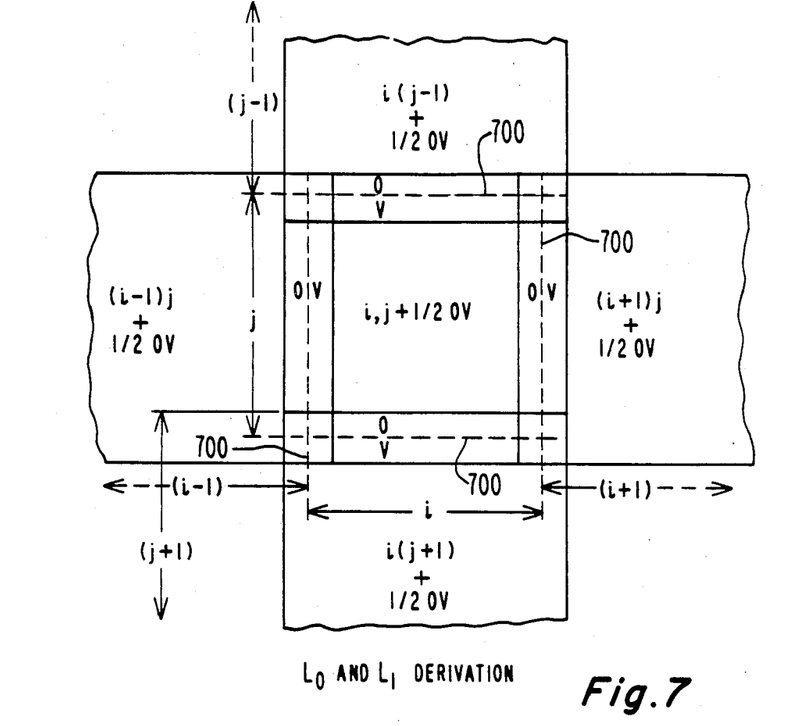
FIG. 7 diagramatically illustrates sub-image trimming for the case of abutting sub-image domains that is usually employed in Laplacian-output derivation.

The operation of abutting sub-image domain trimmers 512-0 and 512-1 in deriving $L'_0$ and $L'_1$ pixels is graphically indicated in FIG. 7. The seam lines defining each abutting sub-image domain are indicated in FIG. 7 by dashed lines 700, which correspond with dashed lines 308 in FIG. 3. It should be noted that each of seam lines 700 occur within the overlap (OV) portions of adjacent television-camera overlap images, and roughly divides such overlap regions in half. Preferably, the seam lines are chosen so that they do not cross a pixel sample position (i.e., the seam line falls in between two adjacent pixel sample positions). However, should pixel samples fall exactly on seam lines, such a pyramid sample may be either copied from one of the two adjacent images or, alternatively, may be the average of the two.

For some applications, it is desirable that the sub-image domains of the $L'_0$ and $L'_1$ pixels overlap one another to some extent, rather than be abutting sub-image domains defined by seam line 700 of FIG. 7. For instance, inspection of such manufactured items as shadow masks and face plates for color television tubes show two types of defects. A first type of image defect (which is low resolution) arises when a particular parameter, such as shadow-mask hole size or face-plate phosphor dot size, is not uniform over the area of the shadow masks or face plate, but varies gradually from one end of the shadow mask or face plate to the other. Machine-vision inspection for this low-resolution first type of defect by a television camera array 100 requires the merger of multiple small-area sub-images into a single low-resolution (e.g., $G_2$) large-area image by a converter 200 of the type discussed above. The second type of defect (which is high resolution) involves only a small set of one or more shadow-mask holes or face-plate phosphor dots situated within a localized area of the shadow mask or face plate. This second type of defect requires the processing of the high resolution $L'_0$ and $L'_1$ pixels by utilization means 202 in order that utilization means 202 be able to recognize such localized-area defects. A problem arises when the position of a localized-area defect just happens to be such that it is intersected by a seam line 700, rather than lying wholly within a single sub-image domain. In this case, utilization means 202 may not be able to recognize the presence of such a localized-area defect by separately processing the $L'_0$ and $L'_1$ pixels of each individual abutting sub-image domain of FIG. 7. This is true because, in this case, seam line 700 divides the localized defect-area of $L'_0$ and $L'_1$ pixels into two or more separate parts, each of which parts is situated in a different one of abutting sub-image domains. The solution to this problem is shown in FIG. 7a.

Figure 7A:
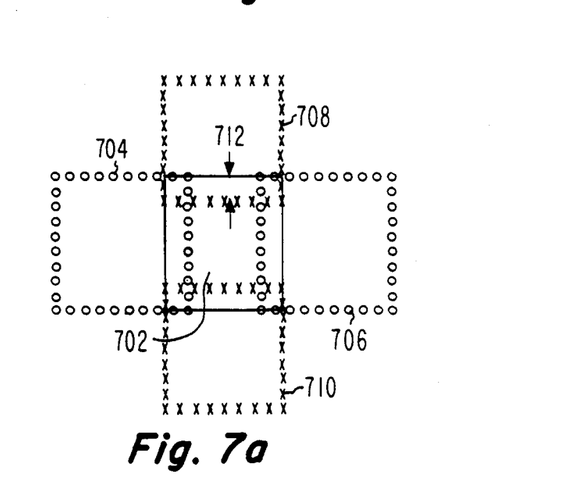
FIG. 7a diagramatically illustrates alternative sub-image trimming for the case of overlapping sub-image domains that is employed in Laplacian-output derivation in certain machine-vision applications.

In FIG. 7a, adjacent sub-image domains of $L'_0$ and $L'_1$ pixels are situated in overlapping relationship with respect to one another, rather than in abutting relationship with respect to each other as in FIG. 7. More specifically, the boundary of a given sub-image domain (delineated by solid lines) is overlapped by surrounding sub-image domains such as 704, 706, 708, and 710 (delineated by circles and x's, respectively). The extent 712 of the overlap is slightly larger than the largest size of any dimension of a localized-area defect. Therefore, all of the $L'_0$ and $L'_1$ pixels of a localized-area defect must lie wholly within at least one of two overlapping sub-image domains (such as sub-image domain 702 or 708, for instance).

For the FIG. 7a case, the operation of sub-image domain trimmers 512-0 and 512-1 would be modified somewhat to permit more of the $L_0$ and $L_1$ pixels derived from each individual television-camera overlap images 300-1,1 to 300-3,3 to be forwarded to the $L'_0$ and $L'_1$ outputs of trimmers 512-0 and 512-1 for storage in buffer 404. Thus, $L'_0$ and $L'_1$ pixels situated within overlap regions, such as overlap region 712, are redundantly stored in buffer 404, once in connection with the storage of the sub-image 702 $L'_0$ and $L'_1$ pixels and again in connection with the storage of the sub-image 708 $L'_0$ and $L'_1$ pixels. In all other respects, the derivation of the $L'_0$ and $L'_1$ pixels is similiar to that described above for the derivation of the $L'_0$ and $L'_1$ pixels of the separate subregions of FIG. 7.

For some applications, it may not be necessary to provide any trimming at all. In this latter case, the $L'_0$ and $L'_1$ pixels would consist of the $L_0$ and $L_1$ pixels themselves.

When the overlapped-area approach is employed for $G_2$ derivation, the $G_2$, $L'_0$ and $L'_1$ derivations all may be carried out together in the same camera module. This is true because the overlapped-area approach to $G_2$ derivation, and the approach to $L'_0$ and $L'_1$ derivation all operate in accordance with the teachings of FIG. 6. However, should the partitioned-area approach be employed for $G_2$ derivation, it is necessary either to sequentially operate the camera memory output program control to derive $G_2$, on the one hand, and $L'_0$ and $L'_1$, on the other hand, separately (i.e., consecutively), rather than together in the same camera module, or, alternatively, employ additional camera-module-structure for each sub-image in order to derive simultaneously both $G_2$ and $L'_0$ and $L'_1$. This is true because the partitioned-area approach to $G_2$ derivation employs the teaching of FIG. 6a, while the derivation of $L'_0$ and $L'_1$ employs the teaching of FIG. 6.

In the illustrative example of the present invention shown in FIG. 4, the pyramid analyzer is restricted to only three levels. However, this need not be the case. In general, in a K-level pyramid analyzer, the Gaussian output from the camera modules is $G_K$, where K may be any value larger or equal to 1. In the partitioned area approach (see FIG. 6a), employing a five-coefficient kernel weighting function in each of the X filter and Y filters of each pyramid analyzer stage, results in the pixel distance at the $G_K$ level being equal to $2^K$ of the pixel distance at the $G_0$ level. Also the five-coefficient kernel weighting function at the K level extends a distance equal to $(2^{K+1} - 1)$ times the $G_0$ pixel distance on either side of its center position. Such an extension can be tolerated in the partitioned area approach. However, in the overlapped-area approach, it is not practical (although it remains possible) to employ more than a three-level pyramid analyzer. This is true because as $G_K$ becomes larger than 2, the number of $G_0$ pixels required to the left and to the right of the i sub-image domain (see FIG. 6) becomes excessive.

Figure 8:
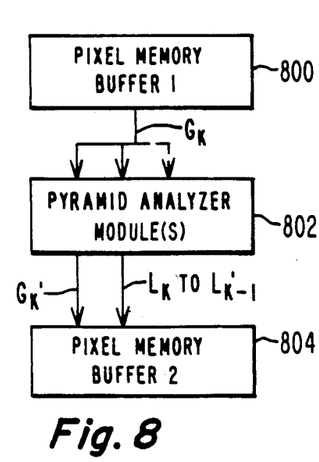
FIG. 8 is a block diagram illustrating additional pyramid processing that may be employed in the implementation of the present invention.

FIG. 8 illustrates the present invention in more general form. First (1) pixel memory buffer 800, for example, may be pixel memory buffer 404. In this case, pyramid analyzer modules 802 is an additional three-level pyramid analyzer module or modules similar to those employed in FIG. 4. Since the pixel distance of $G_2$ is much greater than it is for $G_0$, the total number of sub-image domains (and, hence, the total number of camera modules) required in pyramid analyzer 802 is substantially fewer than it is for the pyramid analyzer shown in FIG. 4. In fact, it is possible that only a single camera module is required. However, the additional structure shown in FIG. 8 makes it possible to derive the values of Gaussian output $G_K'$ and Laplacian outputs $L'_K$ to $L'_{K'-1}$ (where K' is larger than K). Therefore, if K is 2, K' may be 4. Thus, by employing a second pyramid analyzer 802, in addition to the pyramid analyzer of FIG. 4, a five-level pyramid analyzer can be achieved employing high-speed parallel processing that requires a minimum of hardware. As shown in FIG. 8, the pixels of $G_K'$ and $L'_K$ to $L'_{K'-1}$ are stored in second (2) pixel memory buffer 804.

Up to now it has been assumed that the purpose of the present invention is limited to converting multiple small-areas sub-images derived from an array of a plural number of television cameras into a single large-area image. However, the high-speed parallel processing capability of the present invention may be employed to operate on a single image obtained from a single television camera (or some other form of one or two dimensional image sensor). Such a single image may be a high resolution aerial photograph containing a very large number of pixels, for instance. In this latter case, the image area of the single image obtained from the image sensor is purposely divided up into a plurality of contiguous sub-images, each of which sub-images is comprised of many fewer pixels than the original image obtained from the image sensor. Further, in this latter case, first (1) pixel memory buffer 800 may correspond to a camera-image pixel memory and camera-memory output control 400 that receives its image data from the single television camera; pyramid analyzer modules 802 may correspond to pyramid analyzer modules 402, and second (2) pixel memory buffer 804 may correspond to buffer 404.

When a single image is purposely divided up into a plurality of contiguous images, the problem of pixel misalignment between adjacent sub-images (i.e., FIG. 3a) does not exist. Therefore, in this case, it is possible to merge the Laplacian sub-images, in the same manner as the Gaussian sub-images (i.e., as shown in FIGS. 6 and 6a).

It is plain that the arrangement in FIG. 8 may be repeated as many times as is desired (i.e., the pixel stored in second (2) buffer 804 may be read out and analyzed by an additional pyramid analyzer modules (not shown) similar to analyzer 802, and the pixel output from this additional pyramid analyzer may be stored in a third (3) pixel memory buffer (not shown).

In the above description of FIGS. 1 through 7a, it was assumed that significant level value pixels were available in the overlapped region of the television-camera overlap images (see FIG. 3) which could be used in the overlapped-area approach of $G_2$ derivation (see FIG. 6) and in the $L'_0$ and $L'_1$ derivation (see FIG. 7). It is clear from FIG. 3 that such significant-level value pixels are also available in the exterior (EXT) regions of corner and edge television-camera images. In general, however, such exterior (EXT) and such overlap (OV) regions of significant level value pixels (such as shown in FIG. 3) are not always available. For instance, in the case in which the $G_2$ pixels stored in buffer 404 are read out and applied to an additional pyramid analyzer modules (the first case discussed above in connection with FIG. 8), no exterior (EXT) or overlap (OV) regions of significant level value pixels exist. This is also true when the television image from a single television camera is divided up into a plurality of sub-images (the second case discussed above in connection with FIG. 8). In such cases, the following techniques may be employed for artificially deriving substitute exterior and overlapped regions of significant-level pixels required in the performance of the overlapped-area approach (FIG. 6) and the $L'_0$ and $L'_1$ Laplacian derivation of FIG. 7:

(a) Exterior (EXT) Regions:

Should be handled just as if one were forming a single pyramid, using such known techniques as reflection, constant continuation or linear extrapolation. In reflection, the respective pixel level values of the required number of a sub-image (designated by x's in FIG. 6) are reflected across the boundary and appear as substitute exterior-region pixels (designated by dots in FIG. 6). In constant continuation, the level value of the x pixel closest to the boundary for each of the required number of dot pixels of the exterior region is repeated. In linear extrapolation, the level values of the two x pixels closest to the boundary are used to extrapolate level values for the required number of dot pixels of the exterior region. The reflection technique is nice when the image size is chosen so that pixel sample positions at all pyramid levels line up at the boundaries. That is, for a pyramid of K levels, the boundaries should be at zero and a multiple of $2^K$. Then pyramid construction using reflection is identical to constructing a pyramid for an infinite image made up of the original image reflected about its boundaries. This is nice because a pixel level value along the boundaries can be interpreted in the terms of this well defined image.

(b) Overlap (OV) Regions - Gaussian Derivation:

Constant continuation or linear extrapolation techniques should be used (the reflection technique is not desirable).

(c) Overlap (OV) Regions - Laplacian Derivation:

Constant continuation or linear extrapolation techniques are preferable because reflection can introduce large Laplacian values along the boundary. Linear extrapolation causes Laplacian zero-level pixels along the boundary. However, constant continuation provides a better fit to typical image statistics. Further, constant continuation is easier to implement in hardware. Therefore, Laplacian pyramids should be constructed separately for each component image, with boundary treatment for each being in constant continuation or extrapolation (with constant continuation being preferable in most cases).

The present invention is effective in obviating the problem of camera misalignment, shown in FIG. 3a. Specifically, the small amount of horizontal and vertical misalignments $d_H$ and $d_V$ of adjacent camera images is still significant compared to the small pixel-sample distances in the horizontal and vertical directions for the high-resolution Gaussian $G_0$ pixel samples. However, these misalignments are insignificant compared to the larger pixel-sample distances in the horizontal and vertical directions for the merged low-resolution Gaussian $G_K$ pixel samples, and so can be tolerated. In the case of the higher resolution Laplacian $L_0$ and $L_1$ pixel samples, no merger takes place, so that the problem of misalignment is avoided. Further, the Laplacian pixel samples tend to have small level values (since each Laplacian pixel sample level value is the difference between two Gaussian pixel level values).

While small difference in camera gain is significant for each of the respective original high-resolution $G_0$-pixel Gaussian images, it tends to be less significant for the low-resolution $G_K$-pixel Gaussian image, since the level value of each relatively large-size $G_K$-pixel comprises the integrated average of the respective level values of many relatively small-size contiguous $G_0$ pixels. In addition, the small level values of most Laplacian pixels prevents differences in camera-gain from being much of a problem in this latter case.

It should be understood that the pyramid analyzer of the present invention may be utilized with a conventional pyramid synthesizer (not shown) for deriving, when desired, any or all large-area-image Gaussian $G_{K-1}-G_0$ signals from the stored $G_K$ and $L_{K-1}-L_0$ pixels.

What is claimed is:

1. A pyramid-processing method for deriving, substantially without the introduction of spurious spatial-frequency image artifacts, the spatial-frequency spectrum analysis of a single high-resolution image extending over the entirety of a relatively-large-area two dimensional field of view and comprised of pixels having a given pixel density; said deriving being done from an array of relatively-small-area, high resolution sub-images each of which also has said given pixel density and extends over a mutually exclusive two dimensional portion of said two dimensional field of view; said method comprising the steps of:

(a) pyramid-processing said array to derive a separate set of Laplacian-output pyramid levels $L'_0 \ldots L'_{K-1}$ lower than a certain pyramid level K, where K is a given positive integer, for each individual one of said sub-images, wherein Laplacian-output pyramid level $L'_0$ has said given pixel density and each Laplacian output pyramid level above $L'_0$ has a pixel density smaller than its immediately preceding Laplacian-output pyramid level;

(b) pyramid-processing said array to derive a single Gaussian-output pyramid level $G_K$ for the entirety of said relatively large area, wherein said Gaussian-output pyramid level $G_K$ has a pixel density which is smaller than the pixel density of said Laplacian-output pyramid level $L'_{K-1}$; and (c) separately storing respective pixels of each separate set of Laplacian-output pyramid levels $L'_0 \ldots L'_{K-1}$ and respective pixels of said single Gaussian-output pyramid level $G_K$.

2. The method defined in claim 1, wherein said sub-images are similar in size and are contiguous, and wherein each of said steps (a) and (b) of pyramid processing said array comprises the step of pyramid-processing in parallel all of said respective ones of said sub-images of said array.

3. A pyramid-processing method for deriving, substantially without the introduction of spurious spatial-frequency image artifacts, the spatial-frequency spectrum analysis of a single high-resolution image extending over the entirety of a relatively-large-area field of view and comprised of pixels having a given pixel density; said deriving being done from an array of relatively-small-area, high resolution sub-images disposed in abutting relationship with one another, each of which also has said given pixel density, said method comprising the steps of:

(a) pyramid-processing said array to derive a separate set of Laplacian-output pyramid levels $L'_0 \ldots L'_{K-1}$ lower than a certain pyramid level K, where K is a given positive integer, for each individual one of said sub-images, wherein Laplacian-output pyramid level $L'_0$ has said given pixel density and each Laplacian output pyramid level above $L'_0$ has a pixel density smaller than its immediately preceding Laplacian-output pyramid level, including separately pyramid-processing a given set of pixels associated with each individual one of said abutting sub-images of said array with multi-tap spatial filters, all of which filters exhibit a characteristic in each spatial dimension defined by a given kernel weighting function comprised of a certain odd plural number of coefficients symmetrically disposed about the centrally-located coefficient of said kernel weighting function, said given set of pixels associated with any individual one of said abutting sub-images including all the pixles situated within the boundary of that abutting sub-image plus a certain number of additional bordering pixels situated outside the boundary of that abutting sub-image which extend the integer portion of one-half said odd plural number of pixels beyond the boundaries of that abutting sub-image in each dimension thereof, said separate pyramid-processing resulting in the derivation of a separate set of Laplacian-output pyramid levels $L_0 \ldots L_{K-1}$ for each individual one of said abutting sub-images, each of said separate sets having the same pixel density as its corresponding one of said $L'_0 \ldots L'_{K-1}$ pyramid levels and including additional bordering Laplacian-output pyramid level pixels situated outside the boundary of that abutting sub-image which corresponds thereto; and separating trimming said additional bordering pixels of each of said $L_0 \ldots L_{K-1}$ Laplacian-output pyramid levels of the separate set for each individual one of said abutting sub-images to derive thereby said corresponding $L'_0 \ldots L'_{K-1}$ Laplacian output pyramid levels for that abutting sub-image which corresponds thereto;

(b) pyramid-processing said array to derive a single Gaussian-output pyramid level $G_K$ for the entirety of said relatively large area, wherein said Gaussian-output pyramid level $G_K$ has a pixel density which is smaller than the pixel density of said Laplacian-output pyramid level $L'_{K-1}$; and (c) separately storing respective pixels of each separate set of Laplacian-output pyramid levels $L'_0 \ldots L'_{K-1}$ and respective pixels of said single Gaussian-output pyramid level $G_K$.

4. The method defined in claim 3, wherein K is equal to two.

5. The method defined in claim 4, wherein said certain odd plural number is five.

6. A pyramid-processing method for deriving, substantially without the introduction of spurious spatial-frequency image artifacts, the spatial-frequency spectrum analysis of a single high-resolution image extending over the entirety of a relatively-large-area field of view and comprised of pixels having a given pixel density; said deriving being done from an array of relatively-small-area, high-resolution sub-images having respective boundaries and disposed in overlapping relationship each of which also has said given pixel density said method comprising the steps of:
(a) pyramid-processing said array to derive a separate set of Laplacian-output pyramid levels $L'_0 \ldots L'_{K-1}$ lower than a certain pyramid level K, where K is a given positive integer, for each individual one of said sub-images, wherein Laplacian-output pyramid level $L'_0$ has said given pixel density and each Laplacian output pyramid level above $L'_0$ has a pixel density smaller than its immediately preceding Laplacian-output pyramid level, including separately pyramid-processing a given set of pixels associated with each individual one of said overlapping sub-images of said array with multi-tap spatial filters, all of which filters exhibit a characteristic in each spatial dimension defined by a given kernel weighting function comprised of a certain odd plural number of coefficients symmetrically disposed about the centrally-located coefficient of said kernel weighting function, said given set of pixels associated with any individual one of said overlapping sub-images including all the pixels situated within the boundary of that overlapping sub-image plus a certain number of additional bordering pixels situated outside the boundary of that overlapping sub-image which extend the integer portion of one-half said odd plural number of pixels beyond the boundaries of that overlapping sub-image in each dimension thereof, said separate pyramid-processing resulting in the derivation of a separate set of Laplacian-output pyramid levels $L_0 \ldots L_{K-1}$ for each individual one of said overlapping sub-images, each of said separate sets having the same pixel density as its corresponding one of said $L'_0 \ldots L'_{K-1}$ pyramid levels and including additional bordering Laplacian-output pyramid level pixels situated outside the boundary of that overlapping sub-image which corresonds thereto; and
separately trimming said additional bordering pixels of each of said $L_0 \ldots L_{K-1}$ Laplacian-output pyramid levels of the separate set for each individual one of said overlaping sub-images to derive thereby said corresponding $L'_0 \ldots L'_{K-1}$ Laplacian output pyramid levels for that overlapping sub-image which corresponds thereto;
(b) pyramid-processing said array to derive a single Gaussian-output pyramid level $G_K$ for the entirety of said relatively large area, wherein said Gaussian-output pyramid level $G_K$ has a pixel density which is smaller than the pixel density of said Laplacian-output pyramid level $L'_{K-1}$; and
(c) separately storing respective pixels of each separate set of Laplacian-output pyramid levels $L'_0 \ldots L'_{K-1}$ and respective pixels of said single Gaussian-output pyramid level $G_K$.

7. The method defined in claim 6, wherein K is equal to two.

8. The method defined in claim 7, wherein said certain odd plural number is five.

9. A pyramid-processing method for deriving, substantially without the introduction of spurious spatial-frequency image artifacts, the spatial-frequency spectrum analysis of a single high-resolution image extending over the entirety of a relatively-large-area field of view and comprised of pixels having a given pixel density; said deriving being done from an array of relatively-small-area, high-resolution sub-images disposed in abutting relationship with one another each of which also has said given pixel density; said method comprising the steps of:
(a) storing the pixels of each of said high-resolution sub-images of said array in a first memory, whereby the pixels stored in said first memory include a limited first set of significant level-value pixels associated with each individual one of said high-resolution sub-images that are wholly within and define a sub-image domain of that individual one of said sub-images;
(b) pyramid-processing said array to derive a separate set of Laplacian-output pyramid levels $L'_0 \ldots L'_{K-1}$ lower than a certain pyramid level K, where K is a given positive integer, for each individual one of said sub-images, wherein Laplacian-output pyramid level $L'_0$ has said given pixel density and each Laplacian output pyramid level above $L'_0$ has a pixel density smaller than its immediately preceding Laplacian-output pyramid level;
(c) pyramid-processing said array to derive a single Gaussian-output pyramid level $G_K$ for the entirety of said relatively large area, wherein said Gaussian-output pyramid level $G_K$ has a pixel density which is smaller than the pixel density of said Laplacian-output pyramid level $L'_{K-1}$, including reading out from said first memory and separately pyramid processing a given second set of stored significant level-value pixels associated with each individual one of said high-resolution sub-images with multi-tap spatial filters, all of which filters exhibit a characteristic in each spatial dimension defined by a given kernel weighting function comprised of a certain odd plural number of coefficients symmetrically disposed about the centrally-located coefficient of said kernel weighting function, said given second set of stored pixels associated with any individual one of said sub-images including all the stored pixels of said limited first set plus a certain number of bordering pixels which extend the integer portion of one-half said odd plural number of pixels beyond the boundaries of the sub-image domain of that individual one of said sub-images in each spatial dimension thereof, said separate pyramid processing resulting in the derivation of $G_K$ pixels for each individual one of said sub-images that includes certain significant level-value $G_K$ pixels situated wholly within the sub-image domain defined by that individual one of said sub-images; and
(d) separately storing respective pixels of each separate set of Laplacian-output pyramid levels $L'_0 \ldots L'_{K-1}$ and for each individual one of said sub-images, storing in a second memory only its derived certain significant level-value $G_K$ pixels.

10. The method defined in claim 9, wherein K is equal to two.

11. A pyramid-processing method for deriving, substantially without the introduction of spurious spatial-frequency image artifacts, the spatial-frequency spectrum analysis of a single high-resolution image extending over the entirety of a relatively-large-area field of view and comprised of pixels having a given pixel density; said deriving being done from an array of relatively-small-area, high-resolution sub-images each of which also has said given pixel density and extends over only a portion of said field of view; the portions of said field of view over which said sub-images respectively extend together comprising the entirety of said relatively large-area field of view; said method comprising the steps of:
  (a) storing the pixels of each of said high-resolution sub-images of said array in a first memory, whereby the pixels stored in said first memory include a limited first set of significant level-value pixels associated with each individual one of said high-resolution sub-images that are wholly within and define a sub-image domain of that individual one of said sub-images, the sub-image domain of each individual one of said sub-images abutting the respective sub-image domains of those sub-images of said array that are situated next to that individual one of said sub-image;
  (b) pyramid-processing said array to derive a separate set of Laplacian-output pyramid levels $L'_0 \ldots L'_{K-1}$ lower than a certain pyramid level K, where K is a given positive integer, for each individual one of said sub-images, wherein Laplacian-output pyramid level $L'_0$ has said given pixel density and each Laplacian output pyramid level above $L'_0$ has a pixel density smaller than its immediately preceding Laplacian-output pyramid level;
  (c) pyramid-processing said array to derive a single Gaussian-output pyramid level $G_K$ for the entirety of said relatively large area, wherein said Gaussian-output pyramid level $G_K$ has a pixel density which is smaller than the pixel density of said Laplacian-output pyramid level $L'_{K-1}$, including reading out from said first memory and separately pyramid processing all of the limited set of stored pixels defining the sub-image domain associated with each individual one of said high-resolution sub-images with multi-tap spatial filters, all of which filters exhibit a characteristic in each spatial dimension defined by a given kernel weighting function comprised of a certain odd plural number of coefficients symmetrically disposed about the centrally-located coefficient of said kernel weighting function, said separate pyramid processing resulting in the derivation of $G_K$ pixels for each individual one of said sub-images that includes both certain significant level-value $G_K$ pixels situated wholly within the particular sub-image domain of that individual one of said sub-images and additional significant level-value $G_K$ pixels extending into a sub-image domain that abuts that particular sub-image domain; and
  (d) separately storing respective pixels of each separate set of Laplacian-output pyramid levels $L'_0 \ldots L'_{K-1}$ and for each individual one of said sub-images, the steps of (1) adding the level value of each additional $G_K$ pixel that extends into the particular sub-image domain thereof from a sub-image domain that abuts that particular sub-image domain to the level value of the corresponding certain $G_K$ pixel of that particular sub-image domain, thereby altering the respective level values of at least some of said certain $G_K$ pixels of that particular sub-image domain, and (2), following said alteration, separately storing in a second memory the respective level-values of all of the certain $G_K$ pixels of that particular sub-image domain.

12. The method defined in claim 1, further including the preliminary step of deriving from an array of television cameras having overlapping fields of view said array of small-areas, high-resolution sub-images, whereby the respective small-areas of adjacent ones of said television-derived high-resolution sub-images of said array overlap one another.

13. The method defined in claim 1, further including the preliminary step of separately storing the pixels of said respective high-resolution sub-images in a first memory, and performing each of steps a) and b) on pixels of each individual one of said high-resolution sub-images separately read out of said first memory; and wherein
  step (c) comprises the step of storing the respective pixels of said single Gaussian output level $G_K$ in a second memory as a single $G_K$ image; and
  said method comprises the further steps of (1) dividing the single $G_K$ image stored in said second memory into a second array of separate sub-images of $G_K$ pixels; (2) substituting the $G_K$ pixel sub-images of said second array for the high-resolution images of said first-mentioned array and performing the pyramid processing of each of steps (a) and (b) on said $G_K$ pixel sub-images thereby to derive a separate set of Laplacian-output pyramid levels $L'_K \ldots L'_{K'-1}$ lower than a certain pyramid level $K'$, where $K'$ is a given positive integer greater than K, for each individual one of said sub-images of said second array and to derive a single Gaussian output pyramid level $G_{K'}$ for said entire single $G_K$ image stored in said second memory; and (3) separately storing in a third memory the respective pixels of each separate set of Laplacian-output pyramid levels $L'_K \ldots L'_{K'-1}$ and the respective pixels of said single Gaussian output pyramid level $G_{K'}$.

14. In a machine vision system comprised of utilization means responsive to the image content of a high-resolution television image of a given item of interest, said given item of interest having a two dimensional area that is too large to be viewed with high resolution by a single television camera; a combination for deriving the image content of a high-resolution television image of said given item of interest, substantially without the introduction of spurious spatial-frequency image artifacts, for use by said utilization means; said combination comprising;
  a given plural number of separate television cameras arranged in an array, such that the field of view of each individual television camera in said television camera array thus formed partially overlaps the fields of view of those television cameras situated next to that individual television camera and such that the field of view of said television camera array as a whole views said two dimensional area of said given item of interest in its entirety and with high resolution, whereby said television camera array derives a corresponding array of overlapping high-resolution sub-images, each of said high-resolution sub-images including a mutually exclusive two dimensional portion of the image content of said two dimensional area of said given item, but all of said high-resolution sub-images together including all of the image content of said given item; and
  pyramid-processing means responsive to said corresponding array of overlapping high-resolution sub-images for converting said array of sub-images to a spatial-frequency spectrum analysis of a single image defining the content of said given item with high resolution and substantially without the introduction of spurious spatial-frequency image artifacts, said spatial-frequency spectrum analysis of said single image being for use by said utilization means.

15. In a machine vision system comprised of utilization means responsive to the image content of a high-resolution television image of a given item of interest, said given item of interest having an area that is too large to be viewed with high resolution by a single television camera; a combination for deriving the image content of a high-resolution television image of said given item of interest, substantially without the introduction of spurious spatial-frequency image artifacts, for use by said utilization means; said combination comprising:

a given plural number of separate television cameras arranged in an array, such that the field of view of each individual television camera in said television camera array thus formed partially overlaps the fields of view of those television cameras situated next to that individual television camera and such that the field of view of said television camera array as a whole views said area of said given item of interest in its entirety and with high resolution, whereby said television camera array derives a corresponding array of overlapping high-resolution sub-images, each of said high-resolution sub-images including only a portion of the image content of said given item, but all of said high-resolution sub-images together including all of the image content of said given item; and pyramid-processing means responsive to said corresponding array of overlapping high-resolution sub-images for converting said array of sub-images to a spatial-frequency spectrum analysis of a single image defining the content of said given item with high resolution and substantially without the introduction of spurious spatial-frequency image artifacts, said spatial-frequency spectrum analysis of said single image being for use by said utilization means; said pyramid-processing means including:

separate pyramid-analyzer modules equal in number to said given plural number, each of said modules being capable of pyramid processing pixels corresponding to a different one of said high-resolution sub-images into (K+1) pyramid levels comprised of Laplacian pyramid levels $L'_0 \ldots L'_{K-1}$ pixels and Gaussian pyramid-level $G_K$ pixels for each of said different sub-images;

a camera-image pixel memory and camera memory output control coupled to said pyramid analyzer modules for separately storing the pixels of each individual one of said high-resolution sub-images in said camera-image pixel memory, under the control of said camera output control, and reading our certain stored high-resolution pixels belonging to an individual sub-image and applying said read out stored pixels as an input to that separate pyramid analyzer module that corresponds to that individual sub-image; and a large-area (K+1) level pyramid-output pixel memory buffer coupled to said pyramid-analyzer modules separately storing separate sets of Laplacian pyramid-level $L'_0 \ldots L'_{K-1}$ pixels derived, respectively, from each different one of said pyramid analyzer modules and separately storing a single set of $G_K$ pixels derived from all of said different ones of said modules.

16. The combination defined in claim 15, wherein said pixel memory and camera memory output control reads out in parallel the stored pixels of the different sub-images respectively applied as inputs to respective ones of said pyramid-analyzer modules.

17. The combination defined in claim 15, wherein K is equal to two.

18. The combination defined in claim 15, wherein each of said separate pyramid-analyzer modules comprises:

a K-stage pyramid having K stages and having certain stored readout pixels of the high-resolution sub-image corresponding to that separate pyramid-analyzer module applied as an input thereto, said K-stage pyramid deriving Laplacian pyramid-level $L_0 \ldots L_{K-1}$ pixels and $G_K$ pixels;

an individual sub-image domain trimmer associated with each of said stages of said K-stage pyramid for trimming away some of the pixels from that one of the Laplacian pyramid level $L_0 \ldots L_{K-1}$ pixels derived by that stage and thereby obtaining said $L'_0 \ldots L'_{K-1}$ Laplacian pyramid level pixels as an output from each of said respective domain trimmers; and a module-output distributor for selectively steering different groups of $G_K$ pixels derived from said K-stage pyramid to separate sub-image domain storage locations of said pyramid-output pixel memory buffer, one of said different groups of $G_K$ pixels corresponding to a sub-image domain associated with the high-resolution sub-image with which that pyramid-analyzer module corresponds, and each other of said different groups of $G_K$ pixels corresponding to a sub-image domain associated with a high-resolution sub-image that overlaps the high-resolution sub-image with which that pyramid-analyzer module corresponds.

19. A method for pyramid processing a single two dimensional large-area, high-resolution image having a given pixel density; said method comprising the steps of:

(a) dividing said single two dimensional large-area, high-resolution image into a plurality of contiguous two dimensional sub-images each of which has said given pixel density, and each sub image including a mutually exclusive portion of said single two dimensional large area high resolution image;

(b) pyramid-processing in parallel each of said contiguous sub-images to derive a respective set of Laplacian-output pyramid levels $L'_0 \ldots L'_{K-1}$ lower than a certain pyramid level K, where K is a given integer, and a respective Gaussian-output pyramid level $G_K$ wherein each Laplacian-output pyramid level $L'_0$ has said given pixel density and each Laplacian output pyramid level above $L'_0$ has a pixel density smaller than its immediately preceding Laplacian-output pyramid level and each said Gaussian-output pyramid level $G_K$ has a pixel density which is smaller than the pixel density of each said Laplacian-output pyramid level $L'_{K-1}$; and;

(c) merging at least the Gaussian-output pyramid level $G_K$ of each of said respective sub-images into a single large area image.

* * * * *